(12) United States Patent
Uematsu et al.

(10) Patent No.: US 11,056,751 B2
(45) Date of Patent: Jul. 6, 2021

(54) LAMINATE AND SECONDARY BATTERY

(71) Applicant: KABUSHIKI KAISHA TOSHIBA, Minato-ku (JP)

(72) Inventors: Ikuo Uematsu, Yokohama (JP); Yuma Kikuchi, Kashiwazaki (JP); Tomomichi Naka, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 84 days.

(21) Appl. No.: 16/289,750

(22) Filed: Mar. 1, 2019

(65) Prior Publication Data

US 2019/0273235 A1 Sep. 5, 2019

(30) Foreign Application Priority Data

Mar. 1, 2018 (JP) .............................. JP2018-036795

(51) Int. Cl.
*H01M 50/46* (2021.01)
*H01M 10/0585* (2010.01)
*H01M 50/531* (2021.01)

(52) U.S. Cl.
CPC ....... *H01M 50/46* (2021.01); *H01M 10/0585* (2013.01); *H01M 50/531* (2021.01)

(58) Field of Classification Search
CPC . H01M 2/1673; H01M 50/46; H01M 10/0585
See application file for complete search history.

(56) References Cited

U.S. PATENT DOCUMENTS

| | | | |
|---|---|---|---|
| 9,138,932 | B2 | 9/2015 | Huang |
| 2011/0217585 | A1* | 9/2011 | Wang ..................... H01M 2/162 |
| | | | 429/145 |
| 2013/0273406 | A1 | 10/2013 | Ihara et al. |
| 2015/0162584 | A1* | 6/2015 | Uematsu ............... H01M 50/411 |
| | | | 429/163 |
| 2015/0249243 | A1 | 9/2015 | Nagino et al. |

FOREIGN PATENT DOCUMENTS

| | | |
|---|---|---|
| JP | 2011-243344 A | 12/2011 |
| JP | 2012-99385 A | 5/2012 |
| JP | 2013-222582 A | 10/2013 |
| JP | 2014-60118 A | 4/2014 |
| JP | 2014-60123 A | 4/2014 |
| JP | 2015-195183 A | 11/2015 |
| JP | 2018-14169 A | 1/2018 |
| KR | 10-2018-0000344 A | 1/2018 |
| WO | WO 2014/049949 A1 | 4/2014 |

* cited by examiner

*Primary Examiner* — James Lee
(74) *Attorney, Agent, or Firm* — Oblon, McClelland, Maier & Neustadt, L.L.P.

(57) ABSTRACT

According to one embodiment, a laminate includes a first active material-containing layer, a first film and a second film. The first film includes an inorganic material, and a back surface thereof is in contact with a front surface of the first active material-containing layer. The second film includes organic fibers, and one of front and back surfaces is in contact with a front surface of the first film. An absolute value of a difference between surface roughness Ra1 of the front surface of the first active material-containing layer and surface roughness Ra2 of the back surface of the first film is 0.6 μm or less (including 0).

13 Claims, 11 Drawing Sheets

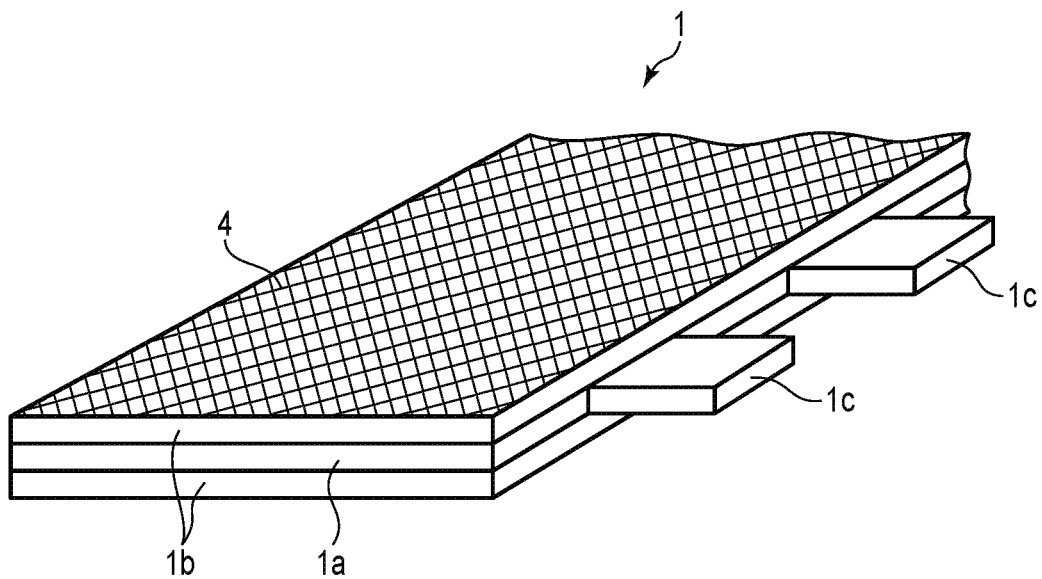
F I G. 4
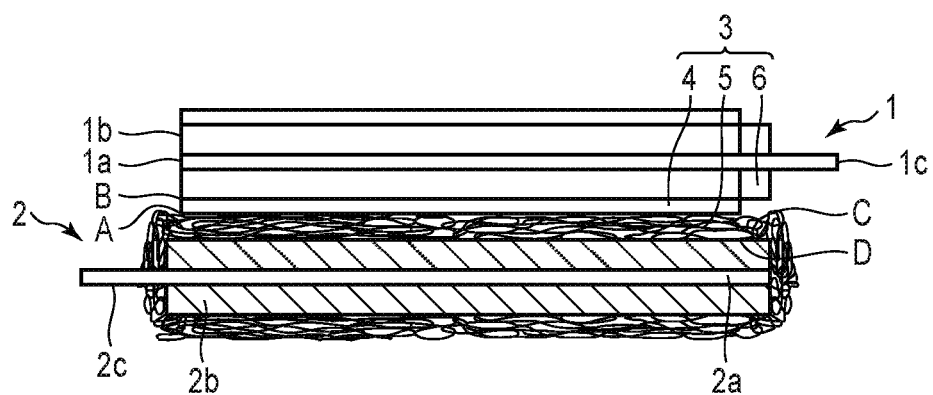
F I G. 5

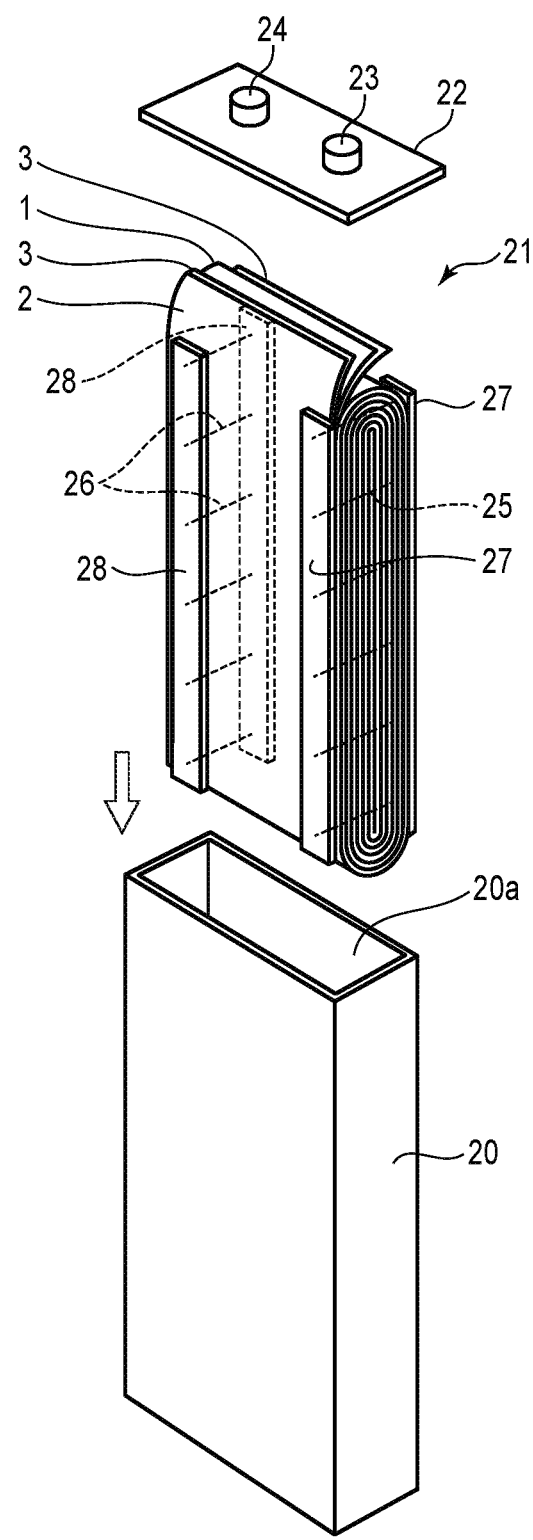
F I G. 10

$$Ra = \frac{1}{l}\int_0^l \{f(x)\}\,dx$$

US 11,056,751 B2

LAMINATE AND SECONDARY BATTERY

CROSS REFERENCE TO RELATED APPLICATIONS

This application is based upon and claims the benefit of priority from the Japanese Patent Application No. 2018-036795, filed Mar. 1, 2018, the entire contents of which are incorporated herein by reference.

FIELD

Embodiments of the present invention relate to a laminate and a secondary battery.

BACKGROUND

In secondary batteries such as lithium secondary batteries, a porous separator is disposed between a positive electrode and a negative electrode to avoid contact between the positive electrode and the negative electrode. A self-supporting film which is distinct from the positive electrode and the negative electrode is used for the separator. An example of this is a fine porous film made of a polyolefin resin. Such a separator is produced, for example, by extrusion-molding a molten material including a polyolefin resin composition into a sheet, extracting and removing substances other than the polyolefin resin, and drawing the resulting sheet.

The resin film separator is required to have sufficient mechanical strength to resist breakage during battery production, and thus it is difficult to reduce the film thickness by much. Since the positive electrode and the negative electrode are stacked or wound while interposing a separator therebetween, if the separator is thick, the number of layers of the positive electrode and the negative electrode that can be stored per unit volume of the battery is limited. This leads to a decrease in a battery capacity. In addition, the resin film separator is poor in durability, and when it is used for a secondary battery, the separator deteriorates in repeated charging and discharging, thus resulting in a decrease in the cycle characteristics of the battery.

In order to reduce the thickness of the separator, it has been studied to integrate a nanofiber film with either the positive electrode or the negative electrode. The electrode-integrated separator has a problem that, since the separator tends to peel off from the electrode, self-discharge of the secondary battery progresses.

BRIEF DESCRIPTION OF THE DRAWINGS

FIG. 4 is a perspective view showing another example of the first electrode;

FIG. 5 is a cross-sectional view showing another example of the laminate of the embodiment;

FIG. 10 is an exploded view of another example of the secondary battery of the embodiment;

DETAILED DESCRIPTION

Figure 1:
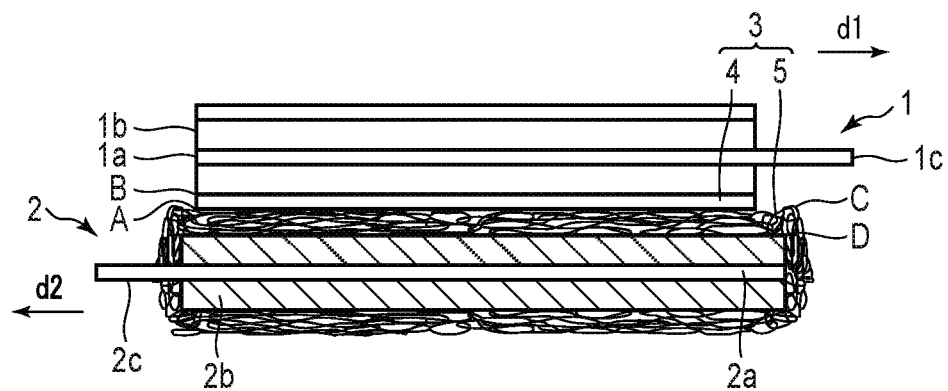
FIG. 1 is a cross-sectional view showing an example of a laminate of an embodiment.

According to one embodiment, there is provided a laminate with improved adherence strength between a first film and an active material-containing layer and a secondary battery including the laminate.

According to the embodiment, there is provided a laminate including a first active material-containing layer, a first film and a second film. The first active material-containing layer includes a front surface and a back surface. The first film includes a front surface and a back surface. The second film includes a front surface and a back surface. The first film includes an inorganic material, and the back surface thereof is in contact with the front surface of the first active material-containing layer. The second film includes organic fibers, and one of the front and back surfaces is in contact with the front surface of the first film. An absolute value of a difference between surface roughness Ra1 of the front surface of the first active material-containing layer and surface roughness Rat of the back surface of the first film is 0.6 μm or less (including 0).

According to another embodiment, a secondary battery including the laminate of the embodiment is provided.

First Embodiment

According to the first embodiment, there is provided a laminate including a first active material-containing layer having a front surface and a back surface, a first film having a front surface and a back surface, and a second film having a front surface and a back surface. The first film includes an inorganic material. The back surface of the first film is in contact with the front surface of the first active material-containing layer. In other words, the first film covers the front surface of the first active material-containing layer. The first film is fixed to the first active material-containing layer by, for example, adhesion, thermal fusion bonding or the like. An absolute value of a difference between surface roughness Ra1 of the front surface of the first active material-containing layer and surface roughness Ra2 of the back surface of the first film is 0.6 μm or less (including 0). The second film includes organic fibers. One of the front surface and the back surface of the second film is in contact with the front surface of the first film. For example, the second film may be integrated with the front surface of the first film or the front surface of the second active material-containing layer disposed to face the first active material-containing layer. There is no particular limitation on how the second film is integrated with the first film or the second active material-containing layer; however, for example, the organic fibers in the second film may be embedded or fitted into the first film or the front surface of the second active material-containing layer.

The difference between the surface roughness Ra1 and the surface roughness Ra2 is indicated by the absolute value of the difference between them. By setting the absolute value of the difference between the surface roughness Ra1 and the surface roughness Ra2 to 0.6 µm or less (including 0), the first film follows deformation of the first active material-containing layer due to, for example, expansion and shrinkage of the active material accompanying charging and discharging. Thus, it is possible to suppress peeling off of the first film from the first active material-containing layer during repetition of charging and discharging or during handling of the laminate, in particular, during application of deformation due to winding or the like. The second film may overlap the first film, and these films function as a separator. Therefore, the insulating property of the separator can be increased, and in the secondary battery including the laminate, self-discharge can be suppressed. In addition, since self-discharge can be suppressed even if the thicknesses of the first film and the second film are reduced, an energy density per unit volume or unit weight of the secondary battery can be increased. Accordingly, it is possible to provide a laminate capable of achieving a secondary battery with high energy density and low self-discharge.

A more preferable range of the absolute value of the difference between the surface roughness Ra1 and the surface roughness Ra2 is 0.55 m or less (including 0). This further improves adherence strength between the first active material-containing layer and the first film and further suppresses self-discharge of the secondary battery.

In the first film, the surface roughness Ra2 of the back surface and the surface roughness Ra3 of the front surface may be the same or different.

Figures 16, 17:
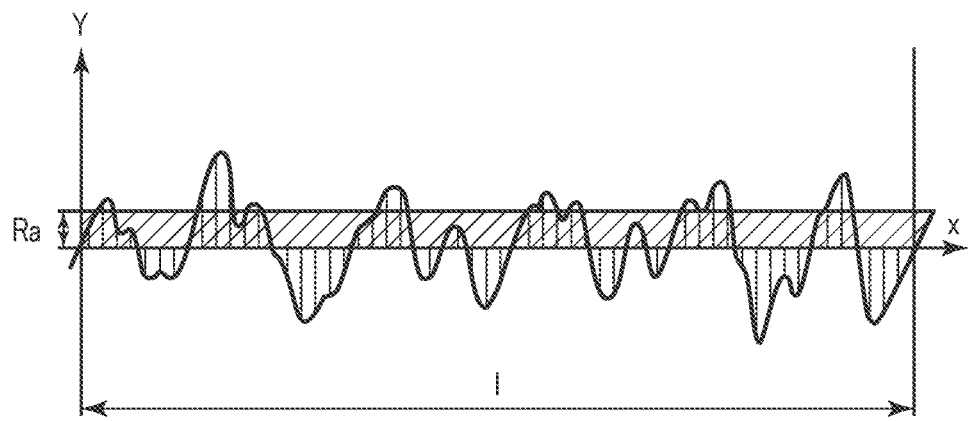
FIG. 16 is a schematic diagram showing a method of calculating an arithmetic mean value Ra of roughness.
FIG. 17 is a view showing an equation for calculating the arithmetic mean value Ra of roughness.

The surface roughness Ra1 and Ra2 are measured by the following method. When the surface roughness of the active material-containing layer and the first film used in the secondary battery are measured, the secondary battery is disassembled under an argon gas atmosphere to take out an electrode group from a container member of the secondary battery. The electrode group is disassembled, and a measurement sample is cut into about 10 mm×10 mm. The cut sample is placed in a beaker in which Ethyl Methyl Carbonate (EMC) is filled and stirred and washed for 30 minutes. The washed sample is dried, and a cross section thereof is obtained. Ion cross section milling is performed on this sample using an ion milling apparatus (IM 4000 PLUS from Hitachi High-Technologies Corporation). An image of a cross section obtained by ion cross section milling is imaged, image processing is performed, and an arithmetic mean value of roughness is obtained. This is defined as Ra. As shown in FIG. 16, the arithmetic mean value Ra of roughness is a value expressed in micrometer (µm) which is obtained by the equation shown in FIG. 17, when a reference length l in the direction of an average line of a roughness curve is determined, x axis is taken in the direction of the average line in the reference length l, y axis is taken in the direction of vertical magnification, and the roughness curve is expressed as y=f(x).

The second active material-containing layer having a front surface and a back surface is further included, and the front surface of the second active material-containing layer is integrated with the other surface of the second film, so that the self-discharge suppressing effect can be further enhanced.

One surface of the second film may be integrated with the front surface of the first film. Thereby, the adherence strength between the first film and the second film can be improved.

The laminate of the embodiment may further include a first current collector and a first current collector tab. In this case, the back surface of the first active material-containing layer is held on a portion of the first current collector. In the first current collector, the first current collector tab is included in another portion not holding the first active material-containing layer. The back surface of the first film covers a portion of the surface of the first current collector tab, which includes a boundary with the first active material-containing layer, so that it is possible to suppress that the first current collector tab is in contact with a counter electrode, which leads to internal short-circuits.

When the first active material-containing layer contains titanium-containing oxide as an active material, precipitation of lithium dendrite in the first film and the second film can be avoided, so that a charge and discharge cycle life of the secondary battery can be improved.

The laminate of the embodiment may further include a second active material-containing layer having a front surface and a back surface, a second current collector, and a second current collector tab. The back surface of the second active material-containing layer is held on a portion of the second current collector. In the second current collector, the second current collector tab is included in another portion not holding the second active material-containing layer. The other of the front surface and the back surface of the second film covers a portion of the surface of the second current collector tab, which includes a boundary with the second active material-containing layer. This configuration contributes to prevention of internal short-circuits.

In the above configuration, taking the following structure (1) or (2), the internal short-circuit suppressing effect is further enhanced.

(1) The other of the front surface and the back surface of the second film covers end surfaces each of the second active material-containing layer and the second current collector.

(2) The second current collector tab protrudes in a first direction from the second active material-containing layer. The other of the front surface and the back surface of the second film covers the end surface located in a direction opposite to the first direction among the end surfaces each of the second active material-containing layer and the second current collector.

Figure 2:
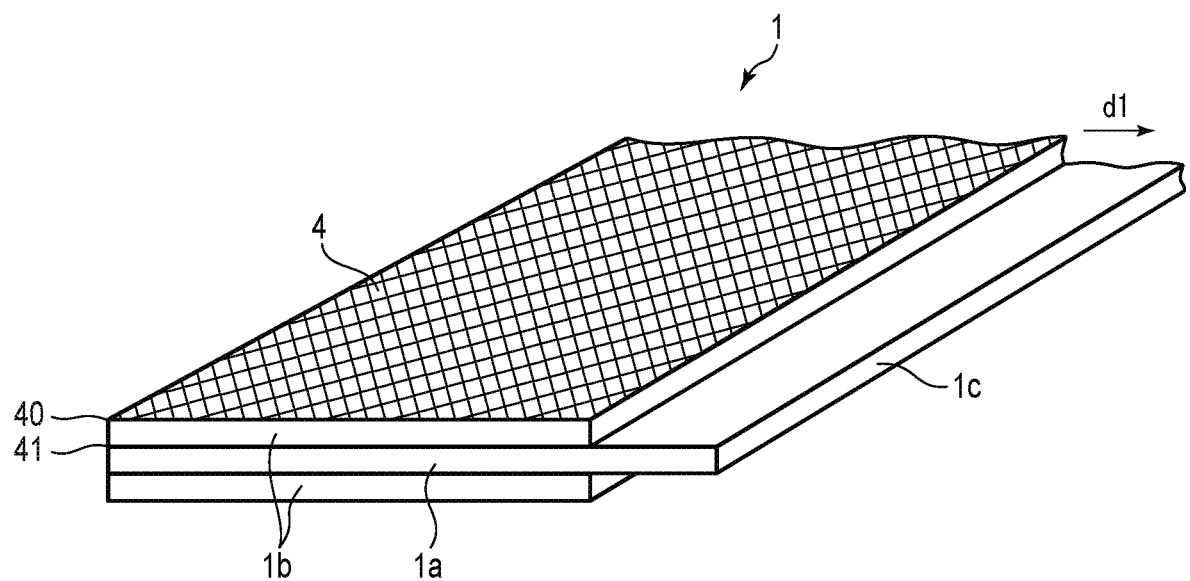
FIG. 2 is a perspective view showing a first electrode of the laminate shown in FIG. 1.

The laminate will be described with reference to FIG. 1 as an example. FIG. 1 is a cross-sectional view showing an example of the laminate of the embodiment. The cross-sectional view of FIG. 1 is a cross-sectional view of the laminate taken in an extending direction of the current collector tab. The laminate shown in FIG. 1 includes a first electrode 1, a second electrode 2, and a separator 3. As shown in FIGS. 1 and 2, the first electrode 1 includes a first current collector 1*a*, a first active material-containing layer 1*b* having a first front surface 40 and a first back surface 41, and a first current collector tab 1*c*. The first current collector 1a is a conductive sheet. The first active material-containing layer 1b is held on a portion of each of both main surfaces of the first current collector 1a. In each main surface of the first current collector 1a, no active material-containing layer is held on one side (for example, long side, short side) and in the vicinity thereof. A non-active material-containing layer holding portion formed parallel to one side of the first current collector 1a functions as the first current collector tab 1c. The first current collector tab 1c protrudes in a first direction d1 from the first active material-containing layer 1b. Among surfaces of the first active material-containing layer 1b, the surface in contact with the first current collector 1a is the first back surface 41.

Figure 3:
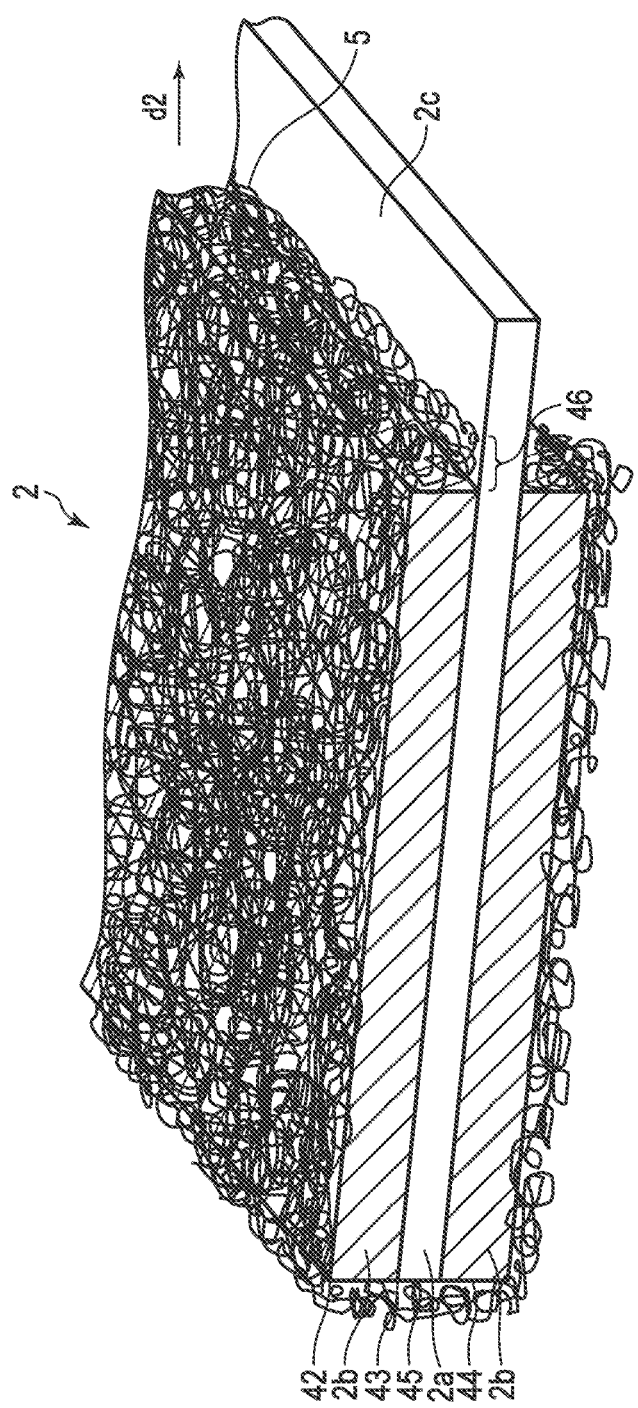
FIG. 3 is a perspective view showing a second electrode of the laminate shown in FIG. 1.

As shown in FIG. 3, the second electrode 2 includes a second current collector 2a, a second active material-containing layer 2b having a second front surface 42 and a second back surface 43, and a second current collector tab 2c. The second current collector 2a is a conductive sheet. The second active material-containing layer 2b is held on a portion of each of both main surfaces of the second current collector 2a. In each main surface of the second current collector 2a, no active material-containing layer is held on one side and in the vicinity thereof. A non-active material-containing layer holding portion formed parallel to one side of the second current collector 2a functions as the second current collector tab 2c. The second current collector tab 2c protrudes in a first direction d2 from the second active material-containing layer 2b. Among surfaces of the second active material-containing layer 2b, the surface in contact with the second current collector 2a is the second back surface 43.

The separator 3 includes a first film 4 including an inorganic material and a second film 5 including organic fibers. The first film 4 has a front surface A and a back surface B, and the second film 5 has a front surface C and a back surface D. As shown in FIGS. 1 and 2, the back surface B of the first film 4 covers the first front surface 40 of each of the first active material-containing layers 1b. Although there is no particular limitation on how the first film 4 is fixed to the first active material-containing layer 1b, there are, for example, adhesion and thermal fusion bonding. An absolute value of a difference between the surface roughness Ra1 of the first front surface 40 of the first active material-containing layer 1b and the surface roughness Ra2 of the back surface B of the first film 4 is 0.6 µm or less (including 0). On the other hand, as shown in FIG. 3, the second film 5 covers the second front surface 42 of each of the second active material-containing layers 2b, four side surfaces 44 crossing the second front surface 42, three end surfaces 45 of the second current collector 2a that are exposed on the outer surface of the second electrode 2, and a portion 46 in both main surfaces of the second current collector tab 2c, which includes the boundary with the second active material-containing layer 2b. Thus, the first active material-containing layer 1b and the second active material-containing layer 2b face each other via the first film 4 and the second film 5.

According to the laminate having the structure shown in FIG. 1, as described above, it is possible to achieve a secondary battery with high energy density and low self-discharge. Since the second film 5 covers the end surface 45 of the second current collector 2a and the portion 46 of a surface of the second current collector tab 2c, which includes the boundary with the second active material-containing layer 2b, internal short-circuits due to a contact between the first electrode 1 and the second electrode 2 are reduced.

The first and second current collector tabs are not limited to one side in the first and second current collectors where no active material-containing layer is held. For example, a plurality of band-like portions protruding from one side of each of the first and second current collectors can be used as the first and second current collector tabs. An example of this is shown in FIG. 4. FIG. 4 shows another example of the first electrode 1. As shown in FIG. 4, the band-like portions protruding from one side of the first current collector 1a may be used as the first current collector tabs 1c.

Hereinafter, the first and second electrodes, the first film, and the second film will be described.

First and Second Electrodes

A counter electrode of the first electrode is the second electrode. While the first electrode may be a positive electrode, the second electrode may be a negative electrode. Alternatively, while the first electrode may be a negative electrode, the second electrode may be a positive electrode.

The first electrode includes a porous first active material-containing layer having a first front surface and a first back surface. On the other hand, the second electrode includes a porous second active material-containing layer having a second front surface and a second back surface.

The first electrode may further include a first current collector and a first current collector tab. On the other hand, the second electrode may further include a second current collector and a second current collector tab. In this case, although the first and second active material-containing layers may be each formed on main surfaces of both the first and second current collectors, the first and second active material-containing layers may be formed on only one surface.

For the active materials of the first and second active material-containing layers, a positive electrode active material and a negative electrode active material are used. One or two or more kinds of active material may be used.

For example, lithium-transition metal composite oxides may be used as the positive electrode active material. Examples thereof may include $LiCoO_2$, $LiNi_{1-x}Co_xO_2$ ($0<x<0.3$), $LiMn_xNi_yCo_zO_2$ ($0<x<0.5$, $0<y<0.5$, and $0 \leq z<0.5$), $LiMn_{2-x}M_xO_4$ (M is at least one element selected from the group consisting of Mg, Co, Al, and Ni, and $0<x<0.2$), $LiMPO_4$ (M is at least one element selected from the group consisting of Fe, Co, or Ni), and the like.

It is possible, as the negative electrode active material, to use carbonaceous materials including graphite, tin-silicon based alloy materials, and the like, but it is preferable to use lithium titanate. Examples of the negative electrode active material further include titanium oxide and lithium titanate both containing other metals such as Nb (niobium). The lithium titanate may include, for example, $Li_{4+x}Ti_5O_{12}$ ($0 \leq x \leq 3$) having a spinel structure, and $Li_{2+y}Ti_3O_7$ ($0 \leq y \leq 3$) having a ramsdellite structure.

The active material may be independent primary particles, secondary particles as agglomerates of primary particles, or a mixture of primary particles and secondary particles.

It is preferable for primary particles of the negative electrode active material to have an average particle size within a range of 0.001 to 1 µm. The average particle size can be determined by, for example, observing the negative electrode active material with SEM. The particle form may be any of particulate and fibrous. When the particles are fibrous, the fiber diameter thereof is preferably 0.1 µm or less. Specifically, the average particle size of the primary particles of the negative electrode active material can be measured from an image observed with a scanning electron microscope (SEM). When lithium titanate having an average particle size of 1 μm or less is used as the negative electrode active material, a negative electrode active material layer having a high surface flatness can be obtained. In addition, when the lithium titanate is used, the resulting battery has a negative electrode potential nobler than that of a lithium ion secondary battery using a typical carbon negative electrode, and thus lithium metal is not deposited according to principle. A negative electrode active material including lithium titanate expands and shrinks less, due to the charge-discharge reaction, and thus collapse of a crystal structure of the active material can be prevented.

In addition to the active material, the first and second active material-containing layers may contain a binder and a conductive agent. Examples of conductive agents include acetylene black, carbon black, graphite, and a mixture thereof. Examples of a binder include polytetrafluoroethylene (PTFE), polyvinylidene fluoride (PVdF), fluorine-based rubbers, and styrene butadiene rubber, and mixtures thereof. The binder has a function of binding the active material and the conductive agent.

In the positive electrode active material-containing layer, the contents of the active material, the conductive agent, and the binder are preferably 80% by mass or more and 97% by mass or less, 2% by mass or more and 18% by mass or less, and 1% by mass or more and 17% by mass or less, respectively. In the negative electrode active material-containing layer, the contents of the negative electrode active material, the conductive agent, and the binder are preferably 70% by mass or more and 98% by mass or less, 1% by mass or more and 28% by mass or less, and 1% by mass or more and 28% by mass or less, respectively.

The thicknesses of the first and second active material-containing layers can be set to 5 μm or more and 100 μm or less, respectively.

The first and second current collectors may be conductive sheets. Examples of the conductive sheet include a foil made of a conductive material. Examples of conductive materials include aluminum and aluminum alloys.

The thicknesses of the first and second current collectors can be set to 5 μm or more and 40 μm or less, respectively.

Although the first and second current collector tabs may be formed of the same material as the current collector, a current collector tab is prepared separately from the current collector and connected to the current collector by welding or the like, and this current collector tab may be used.

First Film

Each of the first films has a front surface and a back surface and includes an inorganic material. One main surface of the first film corresponds to the front surface, and the other main surface corresponds to the back surface. Examples of inorganic materials include oxides (such as groups IIA to VA such as $Li_2O$, $BeO$, $B_2O_3$, $Na_2O$, $MgO$, $Al_2O_3$, $SiO_2$, $P_2O_5$, $CaO$, $Cr_2O_3$, $Fe_2O_3$, $ZnO$, $ZrO_2$, $TiO_2$, magnesium oxide, silicon oxide, alumina, zirconia, and titanium oxide, transition metals, and oxides of IIIB and IVB), zeolite ($M_{2/n}O \cdot Al_2O_3 \cdot xSiO_2 \cdot yH_2O$ wherein M is a metal atom selected from the group consisting of Na, K, Ca and Ba, n is a number corresponding to an electrical charge of a metal cation $Mn^+$, x and y are molar numbers of $SiO_2$ and $H_2O$, respectively, and $2 \leq x \leq 10$ and $2 \leq y$), nitrides (such as BN, AlN, $Si_3N_4$ and $Ba_3N_2$), silicon carbide (SiC), zircon ($ZrSiO_4$), carbonates (such as $MgCO_3$ and $CaCO_3$), sulfates (such as $CaSO_4$ and $BaSO_4$), composites thereof (such as steatite ($MgO \cdot SiO_2$), forsterite ($2MgO \cdot SiO_2$) and cordierite ($2MgO \cdot 2Al_2O_3 \cdot 5SiO_2$) which are kinds of porcelain), tungsten oxide, and a mixture thereof.

Examples of other inorganic materials include barium titanate, calcium titanate, lead titanate, $\gamma$-$LiAlO_2$, $LiTiO_3$, a solid electrolyte, and a mixture thereof.

Examples of the solid electrolyte include a solid electrolyte having no or low lithium ion conductivity and a solid electrolyte having lithium ion conductivity. Examples of oxide particles having no or low lithium ion conductivity include a lithium aluminum oxide (for example, $LiAlO_2$, $Li_xAl_2O_3$ where $0<x\leq1$), a lithium silicon oxide, and a lithium zirconium oxide.

Example of solid electrolytes having lithium ion conductivity include an oxide solid electrolyte having a garnet structure. The oxide solid electrolyte having a garnet structure has advantages that reduction resistance is high, and an electrochemical window is wide. Examples of the oxide solid electrolyte having a garnet structure include $La_{5+x}A_xLa_{3-x}M_2O_{12}$ (A is at least one element selected from the group consisting of Ca, Sr, and Ba, M is Nb and/or Ta, and x is preferably in a range of 0.5 or less (including 0)), $Li_3M_{2-x}L_2O_{12}$ (M is Nb and/or Ta, L contains Zr, and x is preferably in a range of 0.5 or less (including 0)), $Li_{7-3x}Al_xLa_3Zr_3O_{12}$ (x is preferably in a range of 0.5 or less (including 0)), and $Li_7La_3Zr_2O_{12}$. In particular, since $Li_{6.25}Al_{0.25}La_3Zr_3O_{12}$, $Li_{6.4}La_3Zr_{1.4}Ta_{0.6}O_{12}$, $Li_{6.4}La_3Zr_{1.6}Ta_{0.6}O_{12}$, and $Li_7La_3Zr_2O_{12}$ have high ion conductivity and are electrochemically stable, they are superior in discharge performance and cycle life performance.

Examples of solid electrolytes having lithium ion conductivity include a lithium phosphorus solid electrolyte having a NASICON structure. Examples of the lithium phosphorus solid electrolyte having a NASICON structure include $LiM1_2(PO_4)_3$, where M1 is one or more elements selected from the group consisting of Ti, Ge, Sr, Zr, Sn, and Al. Preferred examples thereof include $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$. x is preferably in the range of 0 to 0.5. Each of the exemplified solid electrolytes has high ion conductivity and high electrochemical stability. Both the lithium phosphorus solid electrolyte having a NASICON structure and the oxide solid electrolyte having a garnet structure may be used as a solid electrolyte having lithium ion conductivity.

The first film including at least one type of inorganic material selected from the above is a porous film including aggregates of inorganic material particles. Although inorganic materials having lithium ion conductivity exist as in solid electrolytes, for example, most of inorganic materials have low electron conductivity or an insulating property. Thus, the first film can function as a partition wall separating the positive electrode from the negative electrode. Thus, the first front surface of the first active material-containing layer is covered with the back surface of the first film, and the absolute value of the difference between the surface roughness Ra1 of the first front surface and the surface roughness Rat of the back surface of the first film is set to 0.6 μm or less (including 0), whereby the first front surface of the first active material-containing layer can be covered with a highly insulating film. As a result, it is possible to suppress electro-conduction between the first active material-containing layer and the second active material-containing layer facing the first active material-containing layer through the first film, so that self-discharge can be suppressed.

Since the first film can hold a nonaqueous electrolyte in the porous portion, permeation of Li ions is not inhibited.

The first film including an inorganic material of the above type has a high insulating property while having Li ion permeability. Considering practical aspects, the first film containing alumina is preferable.

The form of the inorganic material may be, for example, granular or fibrous.

An average particle size D50 of inorganic material particles may be 0.5 μm or more and 2 μm or less.

The content of the inorganic material in the first film is desirably in the range of 80% by mass or more and 99.9% by mass or less. Thereby, the insulating property of the first film can be increased.

The first film may include a binder. Examples of the binder include polytetrafluoroethylene (PTFE), polyvinylidene fluoride (PVdF), fluorine-based rubbers, and styrene butadiene rubber, and mixtures thereof. The content of the binder in the first film is desirably in the range of 0.01% by mass or more and 20% by mass or less.

The thickness of the first film can be set to 1 μm or more and 30 μm or less.

Second Film

The second film includes organic fibers. The second film may be a porous film in which organic fibers are deposited in a plane direction. The second film has a front surface and a back surface. One main surface of the second film corresponds to the front surface, and the other main surface corresponds to the back surface.

The organic fiber includes at least one organic material selected from the group consisting of, for example, polyamide-imide, polyamide, polyolefin, polyether, polyimide, polyketone, polysulfone, cellulose, polyvinyl alcohol (PVA) and polyvinylidene fluoride (PVdF). The polyolefin may include, for example, polypropylen (PP), polyethylene (PE), and the like. One or two or more kinds of organic fibers may be used. Preferred is at least one kind selected from the group consisting of polyimide, polyamide, polyamideimide, cellulose, PVdF, and PVA, and more preferred is at least one kind selected from the group consisting of polyimide, polyamide, polyamideimide, cellulose, and PVdF.

Polyimide does not dissolve, melt, or decompose even at 250 to 400° C., and thus a second film having a high heat resistance can be obtained therefrom.

The organic fiber preferably has a length of 1 mm or more and an average diameter of 2 μm or less and more preferably has an average diameter of 1 μm or less. The second film as described above has sufficient strength, porosity, air permeability, pore size, electrolyte resistance, oxidation-reduction resistance, and the like, and thus it functions favorably as the separator. An average diameter of the organic fibers can be measured by observation with a focused ion beam (FIB) device. The length of the organic fiber can be obtained based on a length measurement in the observation with the FIB device.

From the viewpoint of securing ion permeability and electrolyte retentivity, 30% or more of the entire volume of the fibers forming the second film is preferably an organic fiber having an average diameter of 1 μm or less, more preferably an organic fiber having an average diameter of 350 nm or less, further preferably an organic fiber having an average diameter of 50 nm or less.

It is more preferable that a volume of organic fibers having an average diameter of 1 μm or less (more preferably 350 nm or less, further preferably 50 nm or less) is 80% or more of the entire volume of the fibers forming the second film. Such a state can be confirmed by scanning ion microscope (SIM) observation of the second film. It is more preferable that 40% or more of the entire volume of the fibers forming the second film is accounted for by organic fibers having a diameter of 40 nm or less. When the diameter of the organic fiber is small, this means that the effects of interference with the movement of ions are reduced.

It is preferable that a cation exchange group is present on at least a portion of the entire surface including the front surface and the back surface of the organic fiber layer. The movement of ions such as lithium ions passing through the separator is promoted by cation exchange groups, thus resulting in enhanced battery performance. Specifically, it is possible to perform rapid charging or rapid discharging over a long period of time. The cation exchange group is not particularly limited, and may include, for example, a sulfonic acid group and a carboxylic acid group. A fiber having a cation exchange group on its surface can be formed, for example, by the electrospinning method using a sulfonated organic material.

The second film has pores, and an average pore diameter of the pores is preferably 5 nm or more and 10 μm or less. The porosity is preferably 70% or more and 90% or less. When the film has such pores, a separator having excellent ion permeability and good electrolyte impregnating property can be obtained. The porosity is more preferably 80% or more. The average pore size and the porosity of the pores can be confirmed by the mercury penetration method, volume and density calculation, SEM observation, SIM observation, or gas adsorption-desorption method. The porosity is desirably calculated from the volume and density of the second film. The average pore size is desirably measured by the mercury penetration method or the gas adsorption method. When the porosity in the second film is large, this means that the effects of interference with the movement of ions are reduced.

The thickness of the second film is desirably in the range of 12 μm or less. The lower limit of the thickness is not particularly limited but may be 1 μm.

In the second film, the porosity can be increased if the organic fiber included is in a non-dense state, and thus it is not difficult to obtain a layer having a porosity of, for example, about 90%. It is very difficult to obtain a layer having such large porosity as described above if particles are used.

The second film is more advantageous in the unevenness, ease of breakage, capability of impregnation with an electrolyte, adherence, bending property, porosity, and ion permeability than a deposit of inorganic fibers.

The second film may contain particles of an organic compound. This particle is formed of the same material as the organic fiber, for example. The particles may be integrally formed with the organic fibers.

Although the second film may be formed in the second active material-containing layer, the second film may be formed on the first film. Alternatively, the second films may be formed on both front surfaces of the second active material-containing layer and the first film. In either case, one of the front and back surfaces of the second film is in contact with the front surface of the first film.

The thicknesses of the first film and the second film are measured by a method in accordance with the JIS standard (JIS B 7503-1997). Specifically, these thicknesses are measured using a contact-type digital gauge. A material is placed on a stone surface plate, and a digital gauge fixed to the stone surface plate is used. A flat measuring terminal with a tip of φ5.0 mm is used and brought close to a sample from above with a distance of 1.5 mm or more and less than 5.0 mm, and a distance in contact with the sample is the thickness of the sample.

The second film is formed by, for example, the electrospinning method. In the electrospinning method, the first electrode or the second electrode on which the second film is to be formed is earthed and used as an earth electrode.

When the second film is to be formed on the first electrode, the first electrode on which the first film has been formed is prepared.

Figure 12:
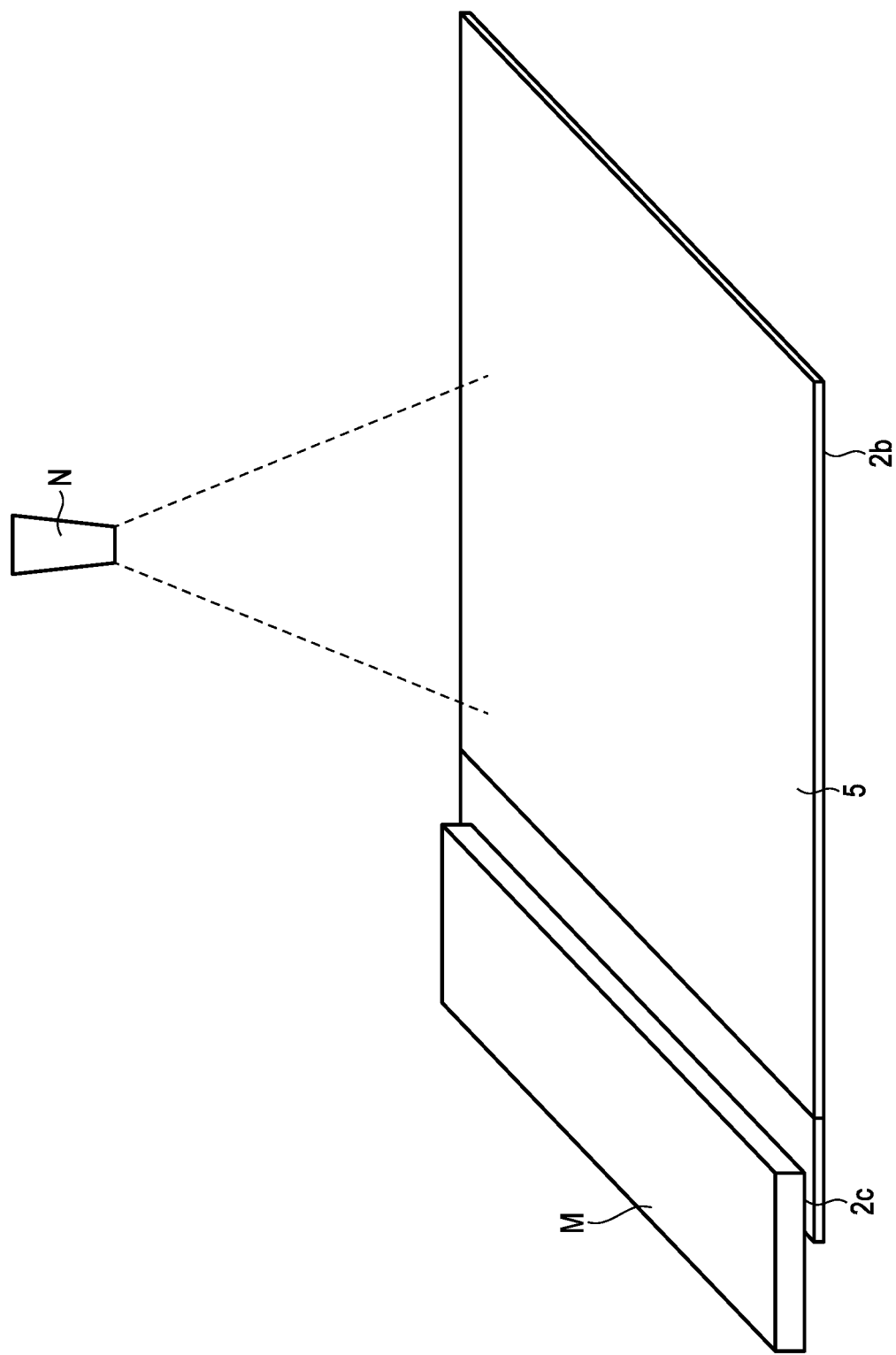
FIG. 12 is a schematic view of a step in a method of producing the laminate of the embodiment.

A liquid starting material (for example, a starting material solution) is charged by a voltage applied to a spinning nozzle, and an electric charge amount per unit volume of the starting material solution is increased by volatilization of a solvent from the starting material solution. The volatilization of the solvent and the increase of the electric charge amount per unit volume occur continuously, which elongates the starting material solution, discharged from the spinning nozzle, in a longitudinal direction, and a nanosized organic fiber is accumulated on the first electrode or the second electrode as an earth electrode. A Coulomb force is generated between the organic fiber and the earth electrode due to a potential between the nozzle and the earth electrode. Thus, the nanosized organic fiber can increase a contact area with the first film, and the organic fiber can be accumulated on the first or second electrode by the Coulomb force. The peel strength from the electrode of the second film, accordingly, can be increased. The peel strength can be controlled, for example, by controlling a solution concentration or a distance between a sample and nozzle. When the second film is not formed on the first and second current collector tabs, it is preferable to form the second film after masking the first and second current collector tabs. This example is shown in FIG. 12. FIG. 12 is a perspective view showing a step of forming the second film on the second electrode. As shown in FIG. 12, the second film 5 is directly formed by depositing as organic fibers a starting material solution discharged from a nozzle N on the second active material-containing layer 2b and the second current collector tab 2c. One side of the second current collector tab 2c and the vicinity thereof are covered with a mask M. Thus, the second film 5 serves as a porous film including organic fibers deposited to straddle the front surface of the second active material-containing layer 2b and a portion of the surface of the second current collector tab 2c, which is adjacent to the second active material-containing layer 2b.

The second film can be easily formed on the electrode surface by using the electrospinning method. According to the electrospinning method, one continuous fiber is formed according to principle, and thus resistance against breakage caused by bending and cracking of the film can be secured. When the second film is formed of continuous seamless organic fibers, the probability of the occurrence of frayed second film or partially missing parts on the second film becomes low, and thus such a film is advantageous in terms of the suppression of self-discharge.

For the liquid starting material used for electrospinning, for example, a starting material solution prepared by dissolving an organic material in a solvent is used. Examples of the organic material can be the same as those mentioned for the organic material constituting the organic fiber. The organic material is used by dissolving it in a solvent at a concentration of, for example, about 5 to 60% by mass. The solvent dissolving the organic material is not particularly limited, and any solvent such as dimethylacetoamide (DMAc), dimethylsulfoxide (DMSO), N,N'-dimethylformamide (DMF), N-methylpyrrolidone (NMP), water, or alcohols can be used. When an organic material having a low solubility is used, the electrospinning is performed while an organic material is molten by using a laser, or the like. In addition, it is acceptable to mix an organic solvent having a high boiling point and an organic solvent having a low melting point.

The second film is formed by discharging the starting material from a spinning nozzle over the surface of a predetermined electrode, while a voltage is applied to the spinning nozzle using a high voltage generator. The applied voltage may be appropriately decided depending on the kind of the solvent and the solute, the boiling point and the vapor pressure curve of the solvent, the concentration of the solution, the temperature, the shape of the nozzle, the distance between the sample and the nozzle, and the like, and, for example, a potential between the nozzle and the workpiece can be from 0.1 to 100 kV. The speed of supply of the starting material may also be appropriately decided depending on the solution concentration, the solution viscosity, the temperature, the pressure, the applied voltage, the nozzle shape, and the like. When a syringe type is used, the speed can be, for example, about 0.1 to 500 μl/minute per nozzle. When multiple nozzles or a slit nozzle is used, the supply speed may be decided depending on the opening area.

The entering of the solvent included in the starting material into the inside of the electrode can be substantially avoided, because the organic fiber is directly formed on the surface of the electrode in a dry state. The amount of the solvent remaining inside the electrode is as extremely low as the ppm level or lower. Any solvent remaining inside the electrode causes a battery loss by an oxidation-reduction reaction, which leads to reduced battery performance. According to the present embodiment, the possibility of causing such defects can be minimized, thus resulting in enhanced battery performance.

Figure 6:
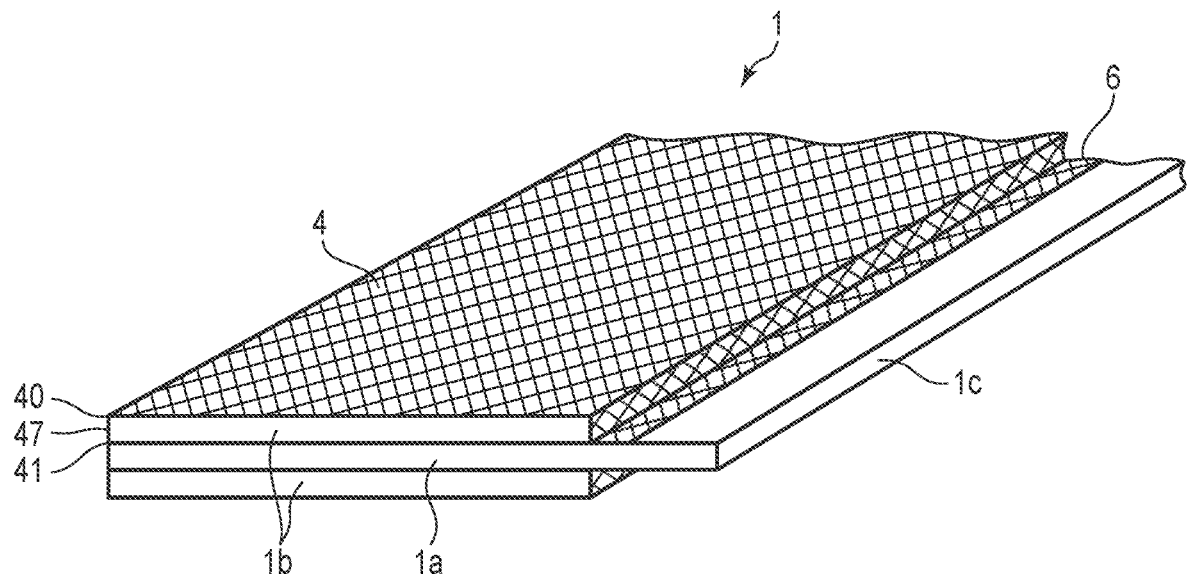
FIG. 6 is a perspective view showing a first electrode of the laminate shown in FIG. 5.
Figure 7:
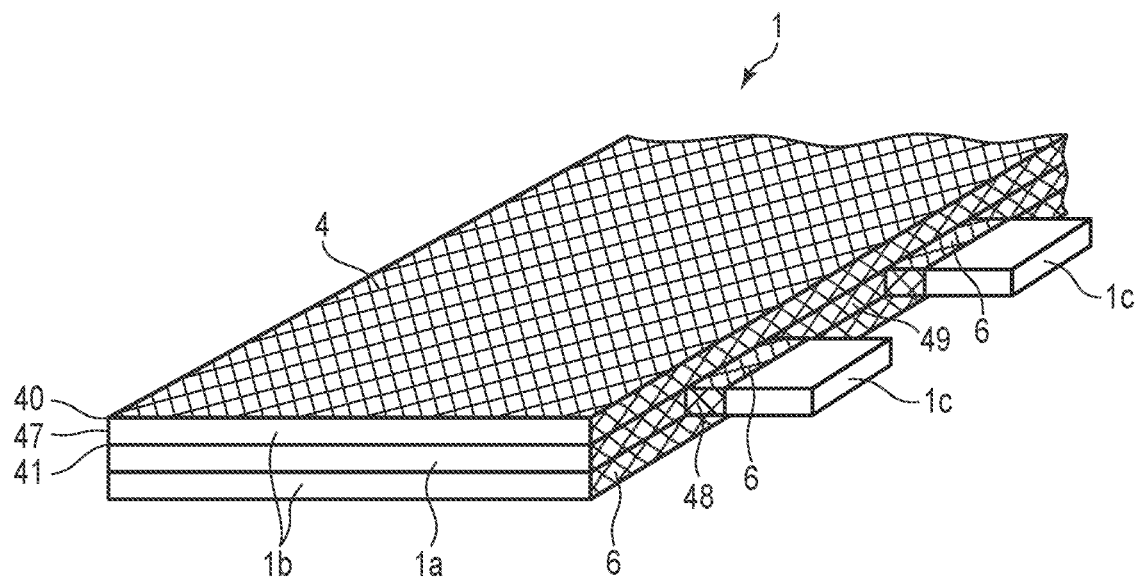
FIG. 7 is a perspective view showing another example of the first electrode.

Although the first film can be formed only on at least one main surface of the first active material-containing layer, at least a portion of the surface of the first current collector tab may be covered with the first film. An example of this is shown in FIGS. 5 and 6. For each of the two first active material-containing layers 1b, four side surfaces 47 crossing the main surface are covered with a first film 6. The first film 6 also covers a portion adjacent to the first active material-containing layers 1b on both main surfaces of the first current collector tab 1c, which is a portion including a boundary between the main surface of the first current collector tab 1c and the first active material-containing layer 1b. A portion where the first film 6 is provided is located at a position close to an end surface located on the opposite side of the side of the second electrode from which the second current collector tab 2c extends along the first direction d2. Provision of the first film 6 can reduce internal short-circuits caused by contact between the first current collector tab 1c of the first electrode and the end surface of the second electrode. When a plurality of band-like portions protruding from one side of the first current collector 1a as shown in FIG. 7 are used as the first current collector tab 1c, it is desirable that the first film 6 covers a portion 48 adjacent to the first current collector 1a of each of four surfaces of the first current collector tab 1c and an end surface 49 of the first current collector 1a located between the first current collector tabs 1c. This configuration is effective for reduction of internal short-circuits.

Figure 8:
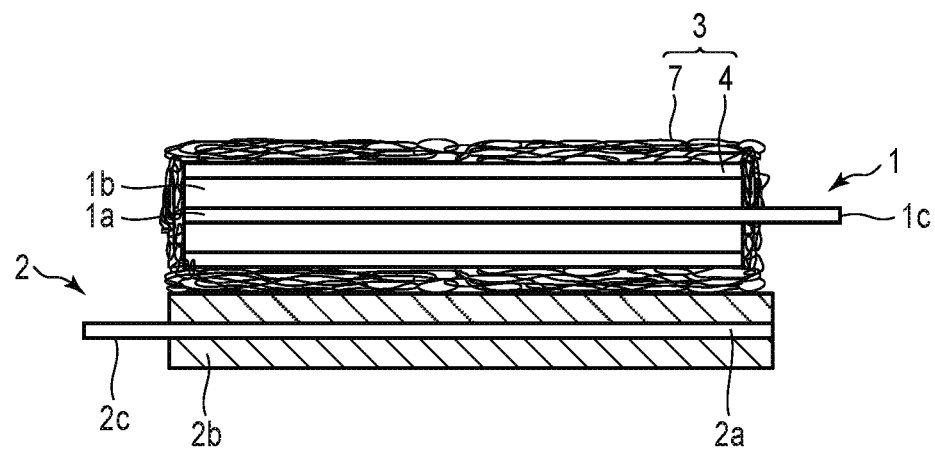
FIG. 8 is a cross-sectional view showing still another example of the laminate of the embodiment.

Although the second film may be formed on the second electrode, the second film may be formed on the first electrode instead of being formed on the second electrode. An example of this is shown in FIG. 8. A second film 7 covers the front surface of the first film 4 and all the end surfaces of the first electrode. The second film 7 also covers a portion including a boundary with the first active material-containing layer 1b in each of both main surfaces of the first current collector tab 1c.

The second electrode is disposed such that the second active material-containing layer 2b faces the first active material-containing layer 1b via the separator 3 including the first film 4 and the second film 7. A portion of the main surface of the first current collector tab 1c, which is adjacent to the first active material-containing layer 1b, is covered with the second film 7, and an end surface located on the side opposite to the side where the first current collector tab 1c of the first electrode protrudes along the first direction d1 is covered with the second film 7. With this configuration, self-discharge and internal short-circuits are suppressed.

A method of producing the laminate of the embodiment will be described below.

First Production Method

Figure 11A:
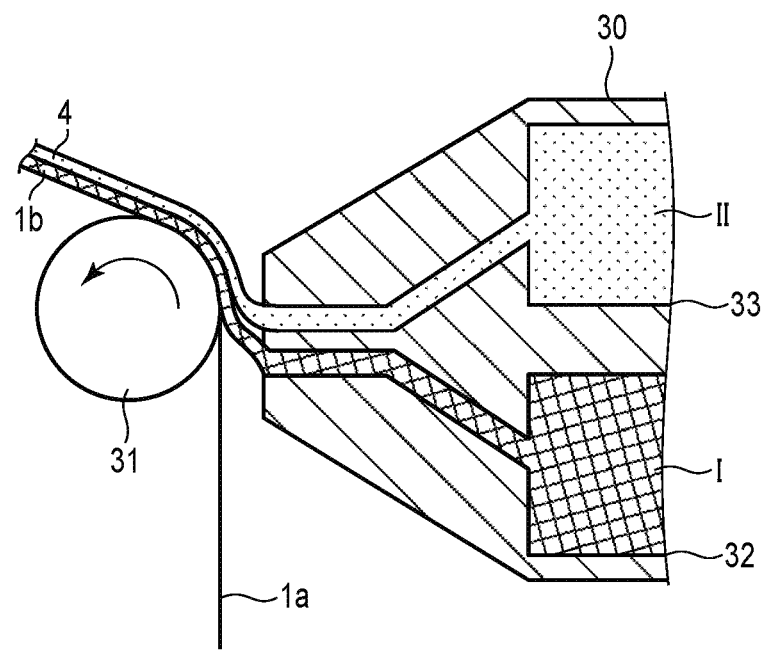
FIG. 11A is a schematic view of a step in a method of producing the laminate of the embodiment.
Figure 11B:
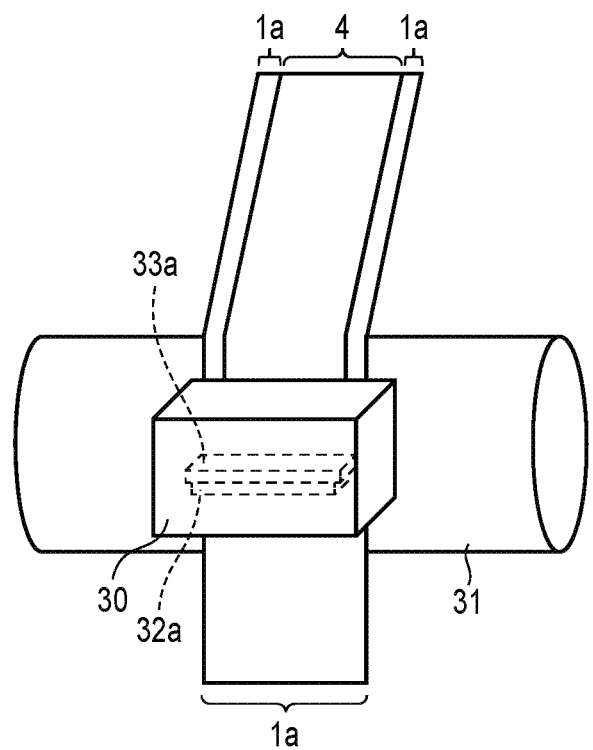
FIG. 11B is a plan view showing a coating apparatus shown in FIG. 11A.

A slurry containing a first active material (hereinafter referred to as slurry I) and a slurry containing an inorganic material (hereinafter referred to as slurry II) are simultaneously coated on at least one main surface of the first current collector. One example of the coating step is shown in FIGS. 11A and 11B. A coating apparatus 30 includes a tank 32 for storing the slurry I and a tank 33 for storing the slurry II and is configured to simultaneously apply the slurry I and the slurry II to a base material. The long first current collector 1a before being cut into a predetermined size is conveyed to a slurry discharge port of the coating apparatus 30 by a conveying roller 31. In FIG. 11B, a slurry I discharge port 32a is located on the upstream side of the current collector with respect to a slurry II discharge port 33a. By such a disposition of the discharge port, the slurry I is applied onto the first current collector 1a from the coating apparatus 30 except both ends in a short-side direction. Then, before the slurry I dries, the slurry II is overapplied so as to protrude from the application region of the slurry I. Since the slurry II is superimposed on the slurry I, the slurry II is more likely to follow the surface shape of the slurry I. Thereafter, after drying the slurry, roll-pressing is applied to the dried slurry, and the resultant body is cut to a predetermined size to obtain a first electrode. When the step of applying the slurry I and the step of applying the slurry II are performed at substantially the same time, the difference in surface roughness can be reduced. In addition, if the period between steps is lengthened, the difference in surface roughness increases. When the drying time of the slurry is shorter, it is possible to reduce the difference in surface roughness. In addition, when pressing pressure is larger, it is possible to reduce the difference in surface roughness. A first electrode in which the absolute value of the difference between the surface roughness Ra1 of the front surface of the first active material-containing layer and the surface roughness Ra2 of the back surface of the first film satisfies 0.6 µm or less (including 0) is obtained by adjusting a timing of applying the slurry I and the slurry II, drying conditions of the slurry, pressing conditions, and the like.

On the other hand, after a slurry containing the second active material is applied to the second current collector, the slurry is dried, roll-pressing is applied to the dried slurry, and the resultant body is cut to a predetermined size to obtain a second electrode. A second film is formed on the second electrode by the electrospinning method. Next, pressing may be applied. As a pressing method, roll pressing or flat-plate pressing may be performed.

The first electrode and the second electrode are stacked to face each other with the first film and the second film interposed therebetween, thus obtaining the laminate of the embodiment.

Second Production Method

A second film is formed by the electrospinning method on the first electrode produced by the first production method. Next, pressing may be applied. The pressing conditions are as described in the first production method.

On the other hand, after a slurry containing the second active material is applied to the second current collector, the slurry is dried, roll-pressing is applied to the dried slurry, and the resultant body is cut to a predetermined size to obtain a second electrode.

The first electrode and the second electrode are stacked to face each other with the first film and the second film interposed therebetween, thus obtaining the laminate of the embodiment.

Even when the laminate obtained by the first or second production method is used as it is as an electrode group or a laminate of a plurality of laminates is used as an electrode group, one set or a plurality of laminates wound spirally may be used as an electrode group. The electrode group may be pressed.

According to the laminate of the first embodiment described above, the first active material-containing layer covered with the first film containing an inorganic material is provided, and the absolute value of the difference between the surface roughness Ra1 of the front surface of the first active material-containing layer and the surface roughness Ra2 of the back surface of the first film is 0.6 µm or less (including 0). Therefore, the first film easily follows deformation of the first active material-containing layer due to, for example, expansion and shrinkage during charging and discharging, and peeling off of the first film from the first active material-containing layer can be suppressed.

Second Embodiment

A secondary battery of the second embodiment includes the laminate of the first embodiment. The secondary battery may further include an electrolyte and a container member capable of containing the electrolyte and the laminate.

Stacked laminates in which the first film and the second film are located between the first active material-containing layer and the second active material-containing layer may be defined as an electrode group and used for a secondary battery. The shape of the electrode group is not limited to this shape, and one or more laminates wound spirally or wound in a flat spiral shape may be used as an electrode group.

The secondary battery may further include a first electrode terminal electrically connected to the first current collector tab and a second electrode terminal electrically connected to the second current collector tab.

As the electrolyte, for example, a nonaqueous electrolyte is used. The nonaqueous electrolyte may include a liquid nonaqueous electrolyte prepared by dissolving an electrolyte in an organic solvent, a gelatinous nonaqueous electrolyte in which a liquid electrolyte is compounded with a polymer material, and the like. The liquid nonaqueous electrolyte can be prepared, for example, by dissolving the electrolyte in an organic solvent at a concentration of 0.5 mol/L or more and 2.5 mol/L or less.

Examples of the electrolyte include lithium salt such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$) and bistrifluoromethylsulfonylimide lithium [$LiN(CF_3SO_2)_2$], or a mixture thereof. Preferably, the electrolyte is hardly oxidized even at a high potential, and $LiPF_6$ is most preferred.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GBL); acetonitrile (AN); and sulfolane (SL). The organic solvents may be used alone or as a mixture of two or more kinds.

Examples of the polymer material include polyvinylidene fluoride (PVdF), polyacrilonitrile (PAN), and polyethyleneoxide (PEO).

As the nonaqueous electrolyte, a room temperature molten salt including lithium ions, which is an ionic melt including lithium ions, a solid polymer electrolyte, and an inorganic solid electrolyte may be used.

As a container member, a metallic container or a laminate film container may be used, for example.

The form of the secondary battery is not particularly limited, and may be various forms such as a cylindrical shape, a flat shape, a thin shape, a prismatic shape, a coin shape, and the like.

Figure 9:
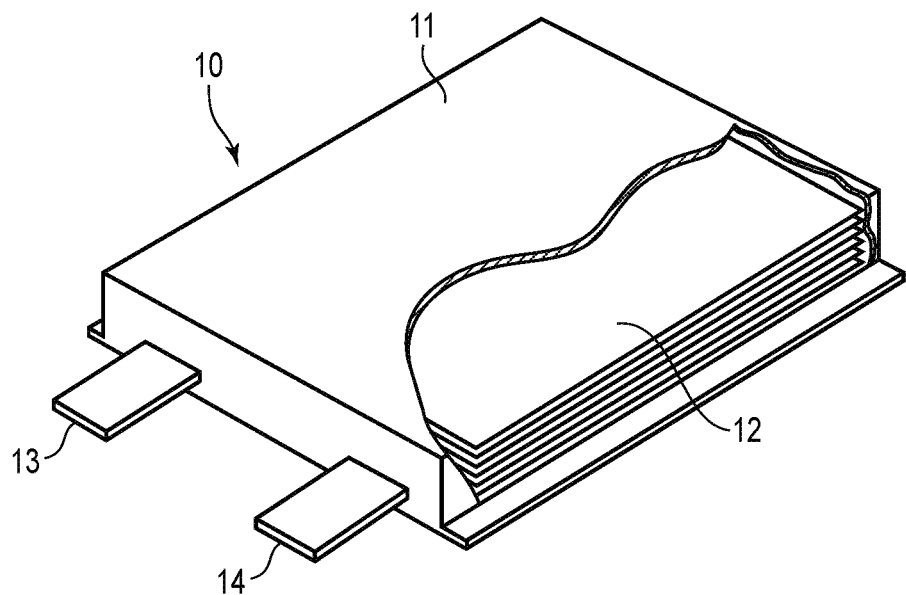
FIG. 9 is a partially cutout perspective view showing an example of the secondary battery of the embodiment.

FIG. 9 is a partially broken perspective view showing an example of the secondary battery according to the embodiment. FIG. 9 is a view showing an example of a secondary battery using a laminate film as a container member. A secondary battery 10 shown in FIG. 9 includes a container member 11 formed of a laminated film, an electrode group 12, a first electrode terminal 13, a second electrode terminal 14, and a nonaqueous electrolyte (not shown). The electrode group 12 includes a plurality of the laminates of the embodiment and has a structure in which a first electrode and a second electrode are stacked via a separator including the first film and the second film. A nonaqueous electrolyte (not shown) is held in or impregnated with the electrode group 12. The first current collector tab of the first electrode is electrically connected to the first electrode terminal 13. The second current collector tab of the second electrode is electrically connected to the second electrode terminal 14. As shown in FIG. 9, each tip of the first electrode terminal 13 and the second electrode terminal 14 protrudes to the outside from one side of the container member 11 with a distance from each other.

FIG. 10 is an exploded perspective view showing another example of the secondary battery according to the embodiment. FIG. 10 is a view showing an example of a secondary battery using a prismatic metal container as a container member. The secondary battery shown in FIG. 10 includes a container member 20, a wound electrode group 21, a lid 22, a first electrode terminal 23, a second electrode terminal 24, and a nonaqueous electrolyte (not shown). The wound electrode group 21 has a structure in which the laminate of the embodiment is wound in a flat spiral shape. In the wound electrode group 21, a first current collector tab 25 wound in a flat spiral shape is located on an end surface in a winding axis direction, and a second current collector tab 26 wound in a flat spiral shape is located on an end surface in the winding axis direction. A nonaqueous electrolyte (not shown) is held in or impregnated with the electrode group 21. A first electrode lead 27 is electrically connected to the first current collector tab 25 and also electrically connected to the first electrode terminal 23. A second electrode lead 28 is electrically connected to the second current collector tab 26 and also electrically connected to the second electrode terminal 24. The electrode group 21 is disposed in the container member 20 such that the first electrode lead 27 and the second electrode lead 28 face the main surface side of the container member 20. The lid 22 is fixed to an opening 20a of the container member 20 by welding or the like. The first electrode terminal 23 and the second electrode terminal 24 are each attached to the lid 22 through an insulating hermetic seal member (not shown).

According to the secondary battery of the second embodiment described above, since the secondary battery includes the laminate of the first embodiment, self-discharge can be suppressed.

EXAMPLES

Example 1

A secondary battery having the first electrode as a positive electrode and the second electrode as a negative electrode was produced by the following method.

$LiNi_{0.33}Co_{0.33}Mn_{0.33}O_2$ particles as a positive electrode active material, carbon black as a conductive agent, and polyvinylidene fluoride as a binder were provided. These were mixed at a mass ratio of 90:5:5 to obtain a mixture. Next, the obtained mixture was dispersed in an n-methylpyrrolidone (NMP) solvent to prepare the slurry I.

100 parts by mass of $Al_2O_3$ particles having an average particle size of 1 µm as an inorganic material and 4 parts by mass of polyvinylidene fluoride were dispersed in NMP to prepare the slurry II.

Using a coating apparatus shown in FIG. 11A and FIG. 11B, the slurry I and the slurry II were overapplied on both surfaces of an aluminum foil having a thickness of 20 µm so that the slurry I and the slurry II were superimposed in this order. As the timing of application, the application rate of the slurry I was 20 m/min, and the application rate of the slurry II was 20 m/min, so that the slurry II was applied onto the slurry I before the slurry I was dried. Thereafter, after drying the slurry I and the slurry II, roll-pressing was applied to the dried slurry at a linear pressure of 1 kN/cm, and the resultant body was cut to a predetermined size to obtain a positive electrode as the first electrode. The positive electrode active material-containing layers each had a thickness of 20 µm. A portion where no positive electrode active material-containing layer was held was provided on one long side of a current collector and used as a positive electrode tab. In the obtained positive electrode, as shown in FIGS. 1 and 2, both front surfaces (main surfaces) of the positive electrode active material-containing layer were covered with the first films. The content of the inorganic material in the first film was 98% by mass.

Organic fibers were deposited on the positive electrode by the electrospinning method to form a second film. As an organic material, polyimide was used. A starting material solution as a liquid starting material was prepared by dissolving polyimide in DMAc, which is a solvent, at a concentration of 20% by mass. The obtained starting material solution was supplied onto the surface of the positive electrode from a spinning nozzle using a metering pump at a supply speed of 5 µl/minute. A voltage of 20 kV was applied to the spinning nozzle using a high voltage generator, thereby the organic fiber layer was formed on the surface of the positive electrode by moving the spinning nozzle in the range of 100×200 mm. In both surfaces (main surfaces) of the positive electrode tab, except a portion of 10 mm from a boundary with the positive electrode active material-containing layer, the electrospinning method was performed while the surface of the positive electrode tab was masked, and a positive electrode having the structure shown in FIG.

8 was obtained. That is, the second film covers the front surface of the first film, four side surfaces orthogonal to the front surface (main surface) of each positive electrode active material-containing layer, three end surfaces of the positive electrode current collector which are exposed on the outer surface of the positive electrode, and a portion in the surface of the positive electrode tab, which includes a boundary with the positive electrode active material-containing layer.

Next, the positive electrode was pressed using a roll press. In the second film, organic fibers had an average diameter of 700 nm, and 50% or more of the entire volume of the fibers forming the second film was accounted for by organic fibers having an average diameter of 1 μm or less. The average pore size was 10 μm, and the porosity was 80%.

On the other hand, a negative electrode which is the second electrode was produced by the following method. Lithium titanate particles having an average primary particle size of 0.5 μm, carbon black as a conductive agent, and polyvinylidene fluoride as a binder were provided. These were mixed at a mass ratio of 90:5:5 to obtain a mixture. The obtained mixture was dispersed in an n-methylpyrrolidone (NMP) solvent to prepare a slurry. The obtained slurry was applied to an aluminum foil having a thickness of 20 μm and dried. Next, the dried coating was pressed to obtain a negative electrode. The negative electrode active material-containing layers each had a thickness of 50 μm. A portion where no negative electrode active material-containing layer was held was provided on one long side of a current collector and used as a negative electrode tab.

Next, a secondary battery was fabricated using the produced positive electrode and negative electrode.

The positive electrode and the negative electrode were arranged such that the positive electrode active material-containing layer and the negative electrode active material-containing layer faced each other with the first film and the second film interposed therebetween, and these were wound in a flat shape to obtain a flat spiral shaped electrode group. After the structure was subjected to vacuum drying at room temperature overnight, it was allowed to stand in a glove box having a dew point of −80° C. or lower for one day. The resulting structure was housed in a metal container together with an electrolytic solution to give a nonaqueous electrolyte battery of Example 1. The electrolytic solution used was obtained by dissolving $LiPF_6$ in ethylene carbonate (EC) and dimethyl carbonate (DMC).

With respect to this secondary battery, the surface roughness Ra1 of the positive electrode active material-containing layer and the surface roughness Ra2 of the back surface of the first film were measured by the method of measuring the arithmetic mean value Ra of roughness, and the results are shown in Table 1. Table 1 also shows the absolute value of the difference between the surface roughness Ra1 and the surface roughness Ra2.

Example 2

A secondary battery was produced in the same manner as in Example 1 except that polyamide was used as the organic material of the second film.

Example 3

A secondary battery having the first electrode as a positive electrode and the second electrode as a negative electrode was produced by the following method.

A positive electrode was produced in the same manner as in Example 1 except that the second film was not formed.

On the other hand, a negative electrode which is the second electrode was produced by the following method. Organic fibers were deposited by the electrospinning method on the negative electrode produced in the same manner as in Example 1, thus forming a second film. As an organic material, polyimide was used. A starting material solution as a liquid starting material was prepared by dissolving polyimide in DMAc, which is a solvent, at a concentration of 20% by mass. The obtained starting material solution was supplied onto the surface of the negative electrode from a spinning nozzle using a metering pump at a supply speed of 5 μl/minute. A voltage of 20 kV was applied to the spinning nozzle using a high voltage generator, thereby the organic fiber layer was formed on the surface of the negative electrode by moving the spinning nozzle in the range of 100×200 mm. In both surfaces (main surfaces) of the negative electrode tab, except a portion of 10 mm from a boundary with the negative electrode active material-containing layer, the surfaces of the negative electrode tab were masked when the electrospinning method was performed, and a negative electrode having the structure shown in FIG. 3 was obtained. That is, the second film covers the front surface (main surface) of each negative electrode active material-containing layer, four side surfaces orthogonal to the front surface, three end surfaces of the negative electrode current collector which are exposed on the outer surface of the negative electrode, and a portion in the surface of the negative electrode tab, which includes a boundary with the negative electrode active material-containing layer.

Next, the negative electrode was pressed using a roll press. In the second film, organic fibers had an average diameter of 700 nm, and 50% or more of the entire volume of the fibers forming the second film was accounted for by organic fibers having an average diameter of 1 μm or less. The average pore size was 10 μm, and the porosity was 80%.

Next, a secondary battery was fabricated in the same manner as in Example 1, using the produced positive electrode and negative electrode.

Example 4

A secondary battery was produced in the same manner as in Example 3 except that polyamide was used as the organic material of the second film.

Comparative Example 1

The slurry I was applied to both sides of an aluminum foil having a thickness of 20 μm. Thereafter, after drying the slurry, roll-pressing was applied to the dried slurry, and the resultant structure was cut to a predetermined size to obtain a positive electrode as a first electrode. A portion where no positive electrode active material-containing layer was held was provided on one long side of a current collector and used as a positive electrode tab.

A secondary battery was fabricated in the same manner as in Example 1, using the obtained positive electrode without the first film and a negative electrode with a second film produced in the same manner as in Example 3.

Comparative Example 2

A secondary battery was fabricated in the same manner as in Example 1, using a positive electrode with a first film produced in the same manner as in Example 3 and a negative electrode without a second film produced in the same manner as in Example 1.

With respect to the obtained secondary battery, the initial capacity was measured by potentiostat measurement at a charging rate of 1C, and the results are shown in Table 2.

In addition, the self-discharge performance of the secondary battery was measured using a potentiostat. The measurement conditions are as follows: SOC (state-of-charge) before storage of 100%, storage temperature of 25° C., and storage term of 2 days. Table 2 shows, as a capacity residual rate, a value which represents the discharge capacity after storage when the discharge capacity before storage is 100%.

TABLE 1

Form inorganic material layer in positive electrode active material-containing layer (wound electrode group)

|  | Surface roughness Ra1 of positive electrode active material-containing layer(μm) | Surface roughness Ra2 of first film (μm) | Difference between Ra1 and Ra2 (absolute value) (μm) | Thickness of first film (μm) | Inorganic material | Formation of second film | Organic material | Thickness of second film (μm) |
|---|---|---|---|---|---|---|---|---|
| Example 1 | 0.783 | 0.260 | 0.523 | 3 | Alumina | On first film | Polyimide | 2 |
| Example 2 | 0.783 | 0.260 | 0.523 | 3 | Alumina | On first film | Polyamide | 2 |
| Example 3 | 0.783 | 0.260 | 0.523 | 3 | Alumina | On negative electrode active material layer | Polyimide | 2 |
| Example 4 | 0.783 | 0.260 | 0.523 | 3 | Alumina | On negative electrode active material layer | Polyamide | 2 |
| Comparative Example 1 | 0.783 | — | — | — | — | On negative electrode active material layer | Polyamide | 2 |
| Comparative Example 2 | 0.783 | 0.260 | 0.523 | 3 | Alumina | — | — | — |

TABLE 2

|  | Initial capacity (Ah) | Self-discharge capacity residual rate(%) |
|---|---|---|
| Example 1 | 1.0 | 2 days 99.98% |
| Example 2 | 1.0 | 2 days 99.98% |
| Example 3 | 1.0 | 2 days 99.97% |
| Example 4 | 1.0 | 2 days 99.97% |
| Comparative Example 1 | 1.0 | 2 days 99.27% |
| Comparative Example 2 | 1.0 | 2 days 41.23% |

As is apparent from Tables 1 and 2, in Examples 1 to 4 in which the absolute value of the difference between the surface roughness Ra1 of the positive electrode active material-containing layer and the surface roughness Ra2 of the back surface of the first film is 0.6 μm or less, the capacity residual rate due to self-discharge is higher than that of Comparative Example 1 including only the second film and Comparative Example 2 including only the first film, and the self-discharge performance is excellent.

Example 5

A secondary battery having the first electrode as a negative electrode and the second electrode as a positive electrode was produced by the following method.

Lithium titanate particles having an average primary particle size of 0.5 μm and serving as a negative electrode active material, carbon black as a conductive agent, and polyvinylidene fluoride as a binder were provided. These were mixed at a mass ratio of 90:5:5 to obtain a mixture. The obtained mixture was dispersed in an n-methylpyrrolidone (NMP) solvent to prepare the slurry I.

100 parts by mass of $Al_2O_3$ particles having an average particle size of 1 μm as an inorganic material and 4 parts by mass of polyvinylidene fluoride were dispersed in NMP to prepare the slurry II.

Using a coating apparatus shown in FIG. 11A and FIG. 11B, the slurry I and the slurry II were overapplied on both surfaces of an aluminum foil having a thickness of 20 μm so that the slurry I and the slurry II were superimposed in this order. As the timing of application, the application rate of the slurry I was 20 m/min, and the application rate of the slurry II was 20 m/min, so that the slurry II was applied onto the slurry I before the slurry I was dried. Thereafter, after drying the slurry I and the slurry II, roll-pressing was applied to the dried slurry at a linear pressure of 1 kN/cm, and the resultant structure was cut to a predetermined size to obtain a negative electrode as the first electrode. The negative electrode active material-containing layers each had a thickness of 30 μm. A portion where no negative electrode active material-containing layer was held was provided on one long side of a current collector and used as a negative electrode tab. In the obtained negative electrode, as shown in FIGS. 1 and 2, both front surfaces (main surfaces) of the negative electrode active material-containing layer were covered with the first films.

Organic fibers were deposited on the negative electrode by the electrospinning method to form a second film. As an organic material, polyimide was used. A starting material solution as a liquid starting material was prepared by dissolving polyimide in DMAc, which is a solvent, at a concentration of 20% by mass. The obtained starting material solution was supplied onto the surface of the negative electrode from a spinning nozzle using a metering pump at a supply speed of 5 μl/minute. A voltage of 20 kV was applied to the spinning nozzle using a high voltage generator, thereby the organic fiber layer was formed on the surface of the negative electrode by moving the spinning nozzle in the range of 100×200 mm. In both surfaces (main surfaces) of the negative electrode tab, except a portion of 10 mm from a boundary with the negative electrode active material-containing layer, the surfaces of the negative electrode tab were masked when the electrospinning method was performed, and a negative electrode having the structure shown in FIG. 8 was obtained. That is, the second film covers the front surface (main surface) of each of the first films, four side surfaces orthogonal to the front surface (main surface) of the negative electrode active material-containing layer, three end surfaces of the negative electrode current collector which are exposed on the outer surface of the negative electrode, and a portion in the surface of the negative electrode tab, which includes a boundary with the negative electrode active material-containing layer.

Next, the negative electrode was pressed using a roll press.

On the other hand, a positive electrode which is the second electrode was produced by the following method. $LiNi_{0.33}Co_{0.33}Mn_{0.33}O_2$ particles as a positive electrode active material, carbon black as a conductive agent, and polyvinylidene fluoride as a binder were provided. These were mixed at a mass ratio of 90:5:5 to obtain a mixture. Next, the obtained mixture was dispersed in an n-methylpyrrolidone (NMP) solvent to prepare a slurry. The obtained slurry was applied to an aluminum foil having a thickness of 20 μm and dried. Next, the dried coating was pressed to obtain a positive electrode. The positive electrode active material-containing layers each had a thickness of 20 μm. A portion where no positive electrode active material-containing layer was held was provided on one long side of a current collector and used as a positive electrode tab.

Next, a secondary battery was fabricated in the same manner as in Example 1, using the produced positive electrode and negative electrode.

With respect to this secondary battery, the surface roughness Ra1 of the negative electrode active material-containing layer and the surface roughness Ra2 of the back surface of the first film were measured by the above-described method, and the results are shown in Table 3. Table 3 also shows the difference between the surface roughness Ra1 and the surface roughness Ra2.

Example 6

A secondary battery was produced in the same manner as in Example 5 except that polyamide was used as the organic material of the second film.

Example 7

A secondary battery having the first electrode as a negative electrode and the second electrode as a positive electrode was produced by the following method.

A negative electrode was produced in the same manner as in Example 5 except that the second film was not formed.

On the other hand, a positive electrode which is the second electrode was produced by the following method. Organic fibers were deposited by the electrospinning method on the positive electrode produced in the same manner as in Example 5, thus forming a second film. As an organic material, polyimide was used. A starting material solution as a liquid starting material was prepared by dissolving polyimide in DMAc, which is a solvent, at a concentration of 20% by mass. The obtained starting material solution was supplied onto the surface of the positive electrode from a spinning nozzle using a metering pump at a supply speed of 5 μl/minute. A voltage of 20 kV was applied to the spinning nozzle using a high voltage generator, thereby the organic fiber layer was formed on the surface of the positive electrode by moving the spinning nozzle in the range of 100×200 mm. In both surfaces (main surfaces) of the positive electrode tab, except a portion of 10 mm from a boundary with the positive electrode active material-containing layer, the electrospinning method was performed while the surfaces of the positive electrode tab were masked, and a positive electrode having the structure shown in FIG. 3 was obtained.

Next, the positive electrode was pressed using a roll press.

Next, a secondary battery was fabricated in the same manner as in Example 1, using the produced positive electrode and negative electrode.

Example 8

A secondary battery was produced in the same manner as in Example 7 except that polyamide was used as the organic material of the second film.

Comparative Example 3

The slurry I was applied to both sides of an aluminum foil having a thickness of 20 μm. Thereafter, after drying the slurry, roll-pressing was applied to the dried slurry, and the resultant structure was cut to a predetermined size to obtain a negative electrode as a first electrode. A portion where no negative electrode active material-containing layer was held was provided on one long side of a current collector and used as a negative electrode tab.

A secondary battery was fabricated in the same manner as in Example 1, using the obtained negative electrode without the first film and a positive electrode with a second film produced in the same manner as in Example 7.

Comparative Example 4

A secondary battery was fabricated in the same manner as in Example 1, using a negative electrode with a first film produced in the same manner as in Example 5 and a positive electrode without a second film produced in the same manner as in Example 5.

With respect to the obtained secondary battery, the initial capacity and a self-discharge amount of the secondary battery were measured by the method described above, and the results are shown in Table 4.

TABLE 3

| | Form inorganic material layer in negative electrode active material-containing layer (wound electrode group) | | | | | | | |
|---|---|---|---|---|---|---|---|---|
| | Surface roughness Ra1 of negative electrode active material-containing layer (μm) | Surface roughness Ra2 of first film (μm) | Difference between Ra1 and Ra2 (absolute value) (μm) | Thickness of first film (μm) | Inorganic material | Formation of second film | Organic material | Thickness of second film (μm) |
| Example 5 | 0.385 | 0.260 | 0.125 | 3 | Alumina | On first film | Polyimide | 2 |
| Example 6 | 0.385 | 0.260 | 0.125 | 3 | Alumina | On first film | Polyamide | 2 |
| Example 7 | 0.385 | 0.260 | 0.125 | 3 | Alumina | On positive electrode active material layer | Polyimide | 2 |

TABLE 3-continued

Form inorganic material layer in negative electrode active material-containing layer (wound electrode group)

| | Surface roughness Ra1 of negative electrode active material-containing layer (μm) | Surface roughness Ra2 of first film (μm) | Difference between Ra1 and Ra2 (absolute value) (μm) | Thickness of first film (μm) | Inorganic material | Formation of second film | Organic material | Thickness of second film (μm) |
|---|---|---|---|---|---|---|---|---|
| Example 8 | 0.385 | 0.260 | 0.125 | 3 | Alumina | On positive electrode active material layer | Polyamide | 2 |
| Comparative Example 3 | 0.385 | — | — | — | — | On positive electrode active material layer | Polyamide | 2 |
| Comparative Example 4 | 0.385 | 0.260 | 0.125 | 3 | Alumina | — | — | — |

TABLE 4

| | Initial capacity (Ah) | Self-discharge capacity residual rate(%) |
|---|---|---|
| Example 5 | 1.0 | 2 days 99.98% |
| Example 6 | 1.0 | 2 days 99.98% |
| Example 7 | 1.0 | 2 days 99.97% |
| Example 8 | 1.0 | 2 days 99.97% |
| Comparative Example 3 | 1.0 | 2 days 98.23% |
| Comparative Example 4 | 1.0 | 2 days 42.11% |

As is apparent from Tables 3 and 4, in Examples 5 to 8 in which the absolute value of the difference between the surface roughness Ra1 of the negative electrode active material-containing layer and the surface roughness Rat of the back surface of the first film is 0.6 μm or less, the capacity residual rate due to self-discharge is higher than that of Comparative Example 3 including only the second film and Comparative Example 4 including only the first film, and the self-discharge performance is excellent.

Figure 13:
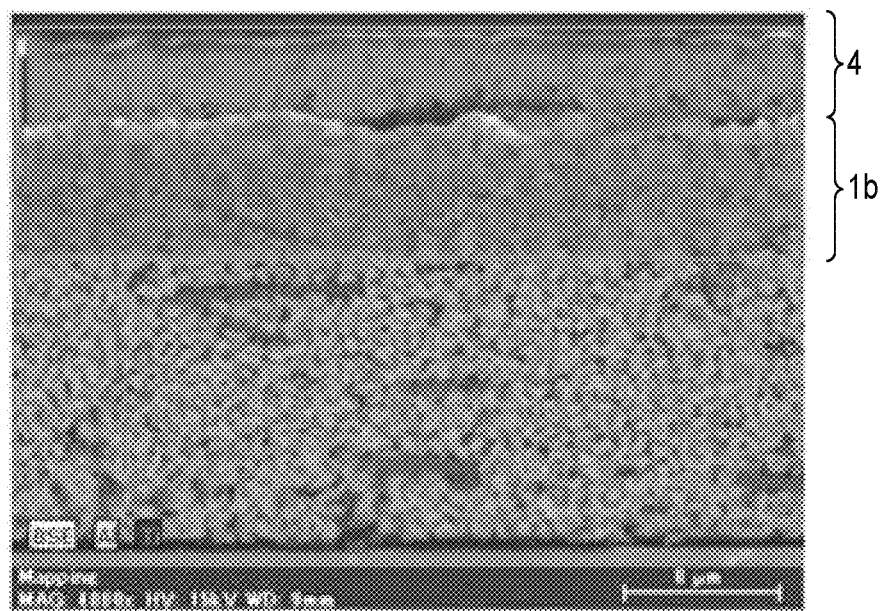
FIG. 13 is image data of a cross section obtained by EDX measurement when a positive electrode of a secondary battery of Example 1 is cut along the thickness direction thereof.
Figure 14:
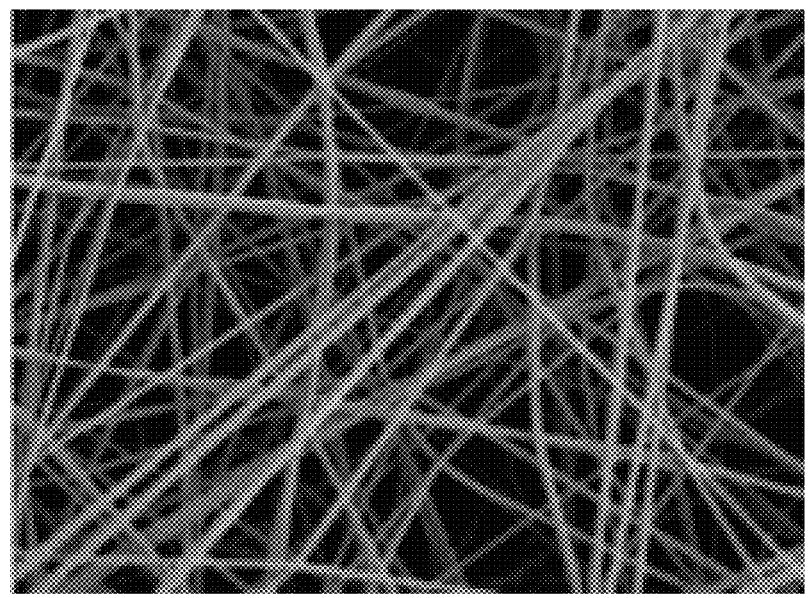
FIG. 14 is a scanning electron micrograph of a front surface of a second film of a negative electrode of Example 3.

FIG. 13 shows image data of a cross section obtained by energy dispersive X-ray spectrometry (EDX) measurement when the positive electrode of the secondary battery of Example 1 is cut along the thickness direction thereof. From FIG. 13, it was confirmed that the first film 4 was formed on the positive electrode active material-containing layer 1b. FIG. 14 shows a scanning electron microscope (SEM) photograph of the front surface of the second film of the negative electrode of the secondary battery of Example 3. As shown in FIG. 14, it can be seen that the second film is a porous film made of organic fibers deposited directly on the negative electrode.

Example A

A plurality of secondary batteries were fabricated in the same manner as in Example 1 except that the first film had a thickness of 2.9 μm and the weight per unit area (application amount) and thickness of the second film were changed. Specifically, a secondary battery in which the second film had a weight per unit area of 1.0 g/m² and a separator including the first film and the second film had a thickness of 3.9 μm, a secondary battery in which the second film had a weight per unit area of 1.3 g/m² and the separator had a thickness of 3.1 μm or 4.8 μm, and a secondary battery in which the second film had a weight per unit area of 1.6 g/m² and the separator had a thickness of 3.3 μm or 5.6 μm were fabricated.

Comparative Example A

A secondary battery was fabricated in the same manner as in Comparative Example 2 except that the first film had a thickness of 2.9 μm.

Comparative Example B

A secondary battery was fabricated in the same manner as in Example 1 except that a separator made of a cellulose nonwoven fabric having a thickness of 14 μm was used instead of providing the first film and the second film.

Figure 15:
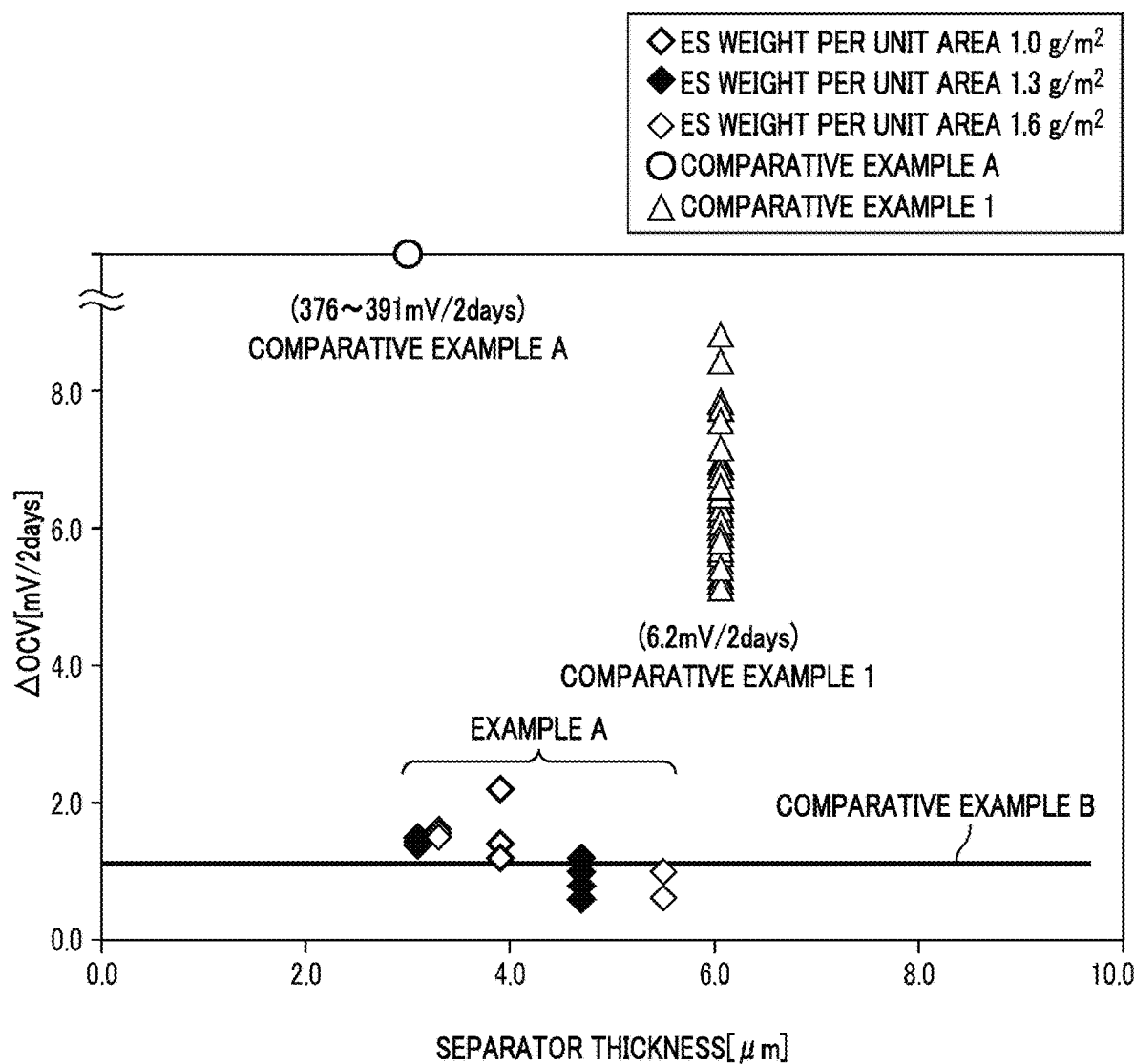
FIG. 15 is a graph showing a relationship between a separator thickness, a weight per uint area of a second film, and an open circuit voltage of the secondary battery in secondary batteries of Example and Comparative Examples.

For the obtained secondary batteries of Example A, Comparative Examples A and B, and Comparative Example 1, a storage test was conducted under conditions where SOC (state-of-charge) before storage was 100%, the storage temperature was 25° C., and the storage term was 2 days, and an open circuit voltage (OCV) of the secondary battery after storage was measured. The results are shown in FIG. 15.

From the comparison between Example A and Comparative Example B, in the secondary battery of Comparative Example B including a cellulose self-standing film as a separator, the open circuit voltage at a separator thickness of 10 μm was 1 mV, whereas in the secondary battery of Example A, the open circuit voltage at a separator thickness of 6 μm or less is within the range of 0.5 to 3 mV.

The open circuit voltage of Comparative Example A using only the first film is 376 to 391 mV, which exceeds 100 times that of Example A. The open circuit voltage of Comparative Example 1 using only the second film is 6.2 mV, which is twice or more than twice that of Example A.

From the above results, it can be seen that self-discharge can be suppressed using a separator thinner than a self-standing film, according to the secondary battery including the laminate of the example.

The laminate according to at least one embodiment and example described above includes the first active material-containing layer covered with the first film containing an inorganic material, and the absolute value of the difference between the surface roughness Ra1 of the front surface of the first active material-containing layer and the surface roughness Ra2 of the back surface of the first film is 0.6 μm or less (including 0). Therefore, the first film easily follows deformation of the first active material-containing layer due to, for example, expansion and shrinkage during charging and discharging, and peeling off of the first film from the first active material-containing layer can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A laminate comprising:
    a first active material-containing layer comprising a front surface and a back surface;
    a first film comprising an inorganic material, a front surface and a back surface, and the back surface being in contact with the front surface of the first active material-containing layer, wherein the content of the inorganic material in the first film is in a range of 80% by mass or more and 99.9% by mass or less;
    a second film comprising organic fibers, a front surface and a back surface, and one of the front surface and the back surface being in contact with the front surface of the first film,
    a first current collector having a top major surface and a bottom major surface; and
    a first current collector tab,
    wherein an absolute value of a difference between surface roughness Ra1 of the front surface of the first active material-containing layer and surface roughness Ra2 of the back surface of the first film is 0.6 μm or less,
    a portion of the top main surface the first current collector holds the back surface of the first active material-containing layer,
    another portion of the top main surface the first current collector not holding the first active material-containing layer comprises the first current collector tab,
    wherein the first current collector and the first current collector tab are in the form of a single conductive sheet, and
    the back surface of the first film covers a portion of a surface of the first current collector tab, which comprises a boundary with the first active material-containing layer.

2. The laminate according to claim 1, further comprising a second active material-containing layer comprising a front surface and a back surface, wherein the front surface of the second active material-containing layer is integrated with the other surface of the second film.

3. The laminate according to claim 1, wherein the one surface of the second film is integrated with the front surface of the first film.

4. The laminate according to claim 1, wherein the first active material-containing layer comprises titanium-containing oxide as an active material.

5. The laminate according to claim 1, wherein the first active material-containing layer comprises a positive electrode active material.

6. The laminate according to claim 1, wherein the inorganic material comprises at least one selected from the group consisting of oxides, zeolites, nitrides, silicon carbide, zircon, carbonates, sulfates, steatite, forsterite, cordierite, tungsten oxide, barium titanate, calcium titanate, lead titanate, $\gamma$-LiAlO$_2$, LiTiO$_3$, and a solid electrolyte.

7. The laminate according to claim 6, wherein the first film is porous.

8. The laminate according to claim 1, wherein the organic fiber comprises at least one selected from the group consisting of polyamide-imide, polyamide, polyolefin, polyether, polyimide, polyketone, polysulfone, cellulose, polyvinyl alcohol, and polyvinylidene fluoride.

9. The laminate according to claim 1 further comprising a second active material-containing layer comprising a front surface, a back surface, a second current collector, and a second current collector tab,
    wherein a portion of the second current collector holds the back surface of the second active material-containing layer, another portion not holding the second active material-containing layer comprises the second current collector tab, and
    the other of the front surface and the back surface of the second film covers a portion of a surface of the second current collector tab, which comprises a boundary with the second active material-containing layer.

10. The laminate according to claim 9, wherein the other of the front surface and the back surface of the second film covers respective end surfaces of the second active material-containing layer and the second current collector.

11. The laminate according to claim 9, wherein the second current collector tab protrudes in a first direction from the second active material-containing layer, and
    the other of the front surface and the back surface of the second film covers, among respective end surfaces of the second active material-containing layer and the second current collector, the end surface located in a direction opposite to the first direction.

12. A secondary battery comprising the laminate according to claim 1.

13. A method of producing the laminate according to claim 1, the method comprising:
    applying a slurry containing a first active material and a slurry containing an inorganic material on at least one main surface of the first current collector, so that the slurry containing the first active material and the slurry containing the inorganic material are superimposed in this order, and the slurry containing the inorganic material is applied onto the slurry containing the first active material before the slurry containing the first active material dries;
    drying the slurry containing the first active material and the slurry containing the inorganic material; and
    applying pressing to the dried slurry,
    whereby the absolute value of the difference between the surface roughness Ra1 of the front surface of the first active material-containing layer and the surface roughness Ra2 of the back surface of the first film made to be 0.6 μm or less.

* * * * *